(12) United States Patent
Wahl

(10) Patent No.: US 7,558,791 B2
(45) Date of Patent: Jul. 7, 2009

(54) SYSTEM AND METHOD FOR ONTOLOGY-BASED TRANSLATION BETWEEN DIRECTORY SCHEMAS

(75) Inventor: Mark Frederick Wahl, Austin, TX (US)

(73) Assignee: Informed Control Inc, Austin, TX (US)

( * ) Notice: Subject to any disclaimer, the term of this patent is extended or adjusted under 35 U.S.C. 154(b) by 22 days.

(21) Appl. No.: 11/881,893

(22) Filed: Jul. 30, 2007

(65) Prior Publication Data

US 2008/0027981 A1      Jan. 31, 2008

Related U.S. Application Data

(60) Provisional application No. 60/834,519, filed on Jul. 31, 2006.

(51) Int. Cl.
*G06F 7/00* (2006.01)
(52) U.S. Cl. .......................................... 707/4; 707/103
(58) Field of Classification Search ............... 707/1–10, 707/100–102, 104.1
See application file for complete search history.

(56) References Cited

U.S. PATENT DOCUMENTS

| | | | |
|---|---|---|---|
| 6,952,704 B2 | 10/2005 | MacLeod et al. | |
| 6,957,230 B2 | 10/2005 | Cameron et al. | |
| 6,985,905 B2 | 1/2006 | Prompt et al. | |
| 7,051,043 B2 | 5/2006 | Cameron et al. | |
| 7,191,192 B2 | 3/2007 | Yellepeddy et al. | |
| 2002/0129153 A1* | 9/2002 | Fleming | 709/230 |
| 2005/0267881 A1* | 12/2005 | Betts et al. | 707/4 |
| 2006/0230070 A1* | 10/2006 | Colton et al. | 707/104.1 |
| 2006/0256813 A1* | 11/2006 | Brusca et al. | 370/466 |
| 2007/0233812 A1* | 10/2007 | Piaseczny et al. | 709/219 |

OTHER PUBLICATIONS

Guo, Hui et al., "Learning Ontologies to Improve . . . " IEEE: ICWS 2007.*
International Telecommunications Union, "Information technology—Open Systems Interconnection—The Directory: Protocol specifications", Rec. X.519, Aug. 1997.
Wahl, Howes and Kille, "Lightweight Directory Access Protocol (v3)", Request for Comments 2251, Internet Engineering Task Force, Dec. 1997.
Zeilenga, "Lightweight Directory Access Protocol (LDAP): Directory Information Models", Request for Comments 4512, Internet Engineering Task Force, Jun. 2006.
International Telecommunications Union, "Information technology—Open Systems Interconnection—The Directory: Selected attribute types", Rec. X.520, Aug. 1997.
International Telecommunications Union, "Information technology—Open Systems Interconnection—The Directory: Selected object classes", Rec. X.521, Aug. 1997.
Smith, "Definition of the inetOrgPerson LDAP Object Class", Request for Comments 2798, Internet Engineering Task Force, Apr. 2000.

(Continued)

*Primary Examiner*—Wilson Lee

(57) ABSTRACT

An information processing system comprising a translation from a directory or individuals input source to a state database containing resource description triples, a mapping of the triples in the state database from one ontology class to another, and a translation from the triples in the state database to a directory or individuals output sink.

11 Claims, 20 Drawing Sheets

OTHER PUBLICATIONS

Sciberras, "Lightweight Directory Access Protocol (LDAP): Schema for User Applications", Request for Comments 4519, Internet Engineering Task Force, Jun. 2006.

Good, "The LDAP Data Interchange Format (LDIF)—Technical Specification", Request for Comments 2849, Internet Engineering Task Force, Jun. 2000.

Tauber, Hay, Beauvais, Burati, and Roberts, "Directory Services Markup Language (DSML)", Dec. 1999, http://www.dsmltools.org/dsml.org/dsml.html.

Rolls, "Service Provisioning Markup Language (SPML) Version 1.0", OASIS Open, Oct. 2003, http://www.oasis-open.org/committees/downloads.php/4137/os-pstc-spml-core-1.0.pdf.

Klyne and Carroll, "Resource Description Framework (RDF): Concepts and Abstract Syntax", W3C, Feb. 2004, http://www.w3.org/TR/rdf-concepts/.

Berners-Lee, Fielding and Masinter, "Uniform Resource Identifier (URI): Generic Syntax", Request for Comments 3986, Internet Engineering Task Force, Jan. 2005.

McGuinness and Van Harmelen, "OWL Web Ontology Language Overview", W3C, Feb. 2004, http://www.w3.org/TR/owl-features/.

Brickley and Miller, "FOAF Vocabulary Specification 0.9", May 2007, http://xmlns.com/foaf/spec/.

Guo, Hui et al., "Learning Ontologies to Improve . . . " IEEE: ICWS 2007.

* cited by examiner

STATE DATABASE

STATE TABLE

| SUBJECT RESOURCE IDENTIFIER | PREDICATE | OBJECT |
|---|---|---|
| URI file://f#uid=p1 | URI file://f#uid | LITERAL DATA "p1" |
| URI file://f#uid=p1 | URI file://f#manager | REFERENCE URI file://f#uid=p2 |
| ANONYMOUS ID src=s1;node=n1 | URI file://f#uid | LITERAL DATA "n1" |
| ANONYMOUS ID src=s1;node=n1 | URI file://f#manager | REFERENCE URI file://f#uid=p2 |

FIG. 2

ONTOLOGY DATABASE

ONTOLOGY FILE SET

| KEY | URI | DEFINITIONS |
|-----|-----|-------------|
|     |     |             |

42

MAPPING RULE SET TABLE

| SOURCE CLASS | DEST CLASS | INFO |
|--------------|------------|------|
|              |            |      |

44

MAPPING FUNCTION SET TABLE

| SOURCE CLASS | DEST CLASS | VM | IMPL |
|--------------|------------|----|------|
|              |            |    |      |

```
package com.informed_control.schemat.i.mapping;

import com.informed_control.schemat.i.common.IOntIndividual;

public interface MappingFunction {
        public boolean shouldSkip (
                        IOntIndividual temporary
                        );
        public IOntIndividual transform (
                                IOntIndividual temporary
                                );
        public boolean flattenReplacement(
                        IOntIndividual replacement
                        );
    }
```

SYSTEM AND METHOD FOR ONTOLOGY-BASED TRANSLATION BETWEEN DIRECTORY SCHEMAS

CROSS-REFERENCE TO RELATED APPLICATIONS

This application claims the benefit of PPA Ser. No. 60/834,519 filed Jul. 31, 2006 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to the translation of identity information between directory servers in enterprise computer networks.

2. Prior Art

A typical identity management deployment for an organization will incorporate a directory service. In a typical directory service, one or more server computers host instances of directory server software. These directory servers implement the server side of a directory access protocol, such as the X.500 Directory Access Protocol, as defined in ITU-T Rec. X.519 "Information technology—Open Systems Interconnection—The Directory: Protocol specifications", or the Lightweight Directory Access Protocol (LDAP), as defined in the document "Lightweight Directory Access Protocol (v3)", by M. Wahl et al of December 1997. The client side of the directory access protocol is implemented in other components of the identity management deployment, such as an identity manager or access manager.

In order to provide an anticipated level of availability or performance from the directory service when deployed on server computer hardware and directory server software with limits in anticipated uptime and performance, the directory service often will have a replicated topology. In a replicated topology, there are multiple directory servers present in the deployment to provide the directory service, and each directory server holds a replica (a copy) of each element of directory information. One advantage of a replicated topology in an identity management deployment is that even if one directory server is down or unreachable, other directory servers in the deployment will be able to provide the directory service to other components of the identity management deployment. Another advantage is that directory service query operations in the directory access protocol can be processed in parallel in a replicated topology: some clients can send queries to one directory server, and other clients can send queries to other directory servers.

Some directory server implementations which support the X.500 Directory Access Protocol also support the X.500 Directory Information Shadowing Protocol (DISP), as defined in the document ITU-T Rec. X.519, "Information technology—Open Systems Interconnection—The Directory: Protocol specifications", which specifies the procedures for replication between directory servers based on X.500 protocols.

In many large and multinational enterprises, the deployment might incorporate multiple distinct implementations of a directory server, and there may be directory server implementations that are not based on the X.500 protocols. Examples of directory server implementations that are not based on the X.500 protocols include the Microsoft Active Directory, the Sun Java Enterprise System Directory Server, OpenLDAP directory server, and the Novell eDirectory Server. As there is currently no standard replication protocol between directory server implementations from different vendors that are not both implementing the X.500 protocols, synchronization mechanisms are often used in addition to replication protocols in order to maintain the consistency of directory information between directory servers in the deployment. Synchronization products, such as a metadirectory server, are used in enterprise identity management deployments that incorporate directory server implementations from multiple vendors. These synchronization products interconnect these directory servers, and transfer changes made in one directory server to another directory server, so that all directory servers have copies of the data.

A primary component of the information model of a directory server is the directory information tree. The directory information tree comprises a set of one or more directory entries. Each entry has a distinguished name that is unique amongst the entries in the directory information tree. Each entry comprises a set of one or more attributes. Each attribute has an attribute type, and there is at most one attribute in an entry of each attribute type. Each attribute has one or more values. Each entry has an attribute, objectClass, with one or more values that are names of object classes defining the contents of the entry.

A directory schema defines the semantics associated with each object class and attribute type. The schema specifications for an object class include: the attribute types of attributes which must be present in an entry when the entry has that object class, and the attribute types of attributes which may be present in an entry when the entry has that object class. The schema specifications for an attribute type include: the maximum number of values of the type which can be present in an entry, the syntax of the values of the attribute type, and how values of the attribute are compared with each other. The directory schema is represented in the directory as values of the two operational attributes attributeTypes and objectClasses, as described in "Lightweight Directory Access Protocol (LDAP): Directory Information Models", by K. Zeilenga, of June 2006.

The choice of schema to use in a directory server is determined by the administrator of the directory server. Some directory server implementations have a single, fixed schema; others are extensible and permit the administrator to add attribute type and object class definitions. Several recommended schemas have been published, including the documents ITU-T X.520|ISO/IEC 9594-6, "The Directory: Selected attribute types", ITU-T X.521|ISO/IEC 9594-7, "The Directory: Selected object classes", "Definition of the inetOrgPerson LDAP Object Class" by M. Smith of 2000, "Lightweight Directory Access Protocol (LDAP): Directory Information Models" by K. Zeilenga of June 2006, and "Lightweight Directory Access Protocol (LDAP): Schema for User Applications", by A. Sciberras of June 2006.

All or a subset of the entries held by a directory server in its directory information tree can be exported to a text file. One format for representing directory entries in a text file is the Lightweight Directory Access Protocol Data Interchange Format (LDIF), described in the document "The LDAP Data Interchange Format (LDIF)—Technical Specification", by G.

Good, of June 2000. There are two LDIF formats: the LDIF content format, in which there is one record in the file for each entry to be represented, and the LDIF changes format, in which there is one record in the file for each change to a directory entry to be represented. Another format for representing directory entries in a text file is Directory Services Markup Language (DSML), described in the document "Directory Services Markup Language (DSML)", by J. Tauber, T. Hay, T. Beauvais, M. Burati, and A. Roberts, of December 1999. Another format for representing directory entries in a text file is Service Provisioning Markup Language, described in the document "Service Provisioning Markup Language (SPML) Version 1.0" by D. Rolls of October 2003. As each entry in the directory information tree has a distinguished name that is unique among all the entries in the directory information tree, each record in a DSML file, in an LDIF file in the LDIF content format, or in a SPML file comprising a SearchResponse has a distinguished name that is unique among the records for entries in that file.

A metadirectory, as described in U.S. Pat. No. 7,191,192 B2 to Yellepeddy et al, is a software product which translates the contents of one data repository to be appropriate for use in another repository, in which the data repositories may be directory servers or other forms of databases. One primary use of a metadirectory is the translation of directory entries from one schema to another, for deployments in which two or more implementations of directory servers are present, and the directory servers have fixed incompatible schemas.

Another data representation framework is the Resource Description Framework (RDF), as described in the document "Resource Description Framework (RDF): Concepts and Abstract Syntax", by G. Klyne and J. Carroll, of February 2004. In RDF, statements concerning a resource are represented as a collection of triples. The three fields of a triple are the subject resource identifier field, the predicate field, and the object field.

There are two kinds of subject resource identifier field of an RDF triple: the URI kind and the anonymous kind. In the URI kind of resource identifier field, the resource identifier field comprises a Uniform Resource Identifier (URI), as defined in the document "Uniform Resource Identifier (URI): Generic Syntax", by T. Berners-Lee, R. Fielding, L. Masinter, of January 2005. In the anonymous kind of resource identifier field, the resource identifier field comprises a combination of an input source identifier, and a string value. In the anonymous kind of resource identifier field, the string value is unique within the context of the input source.

The predicate field of an RDF triple is a Uniform Resource Identifier. An example of a predicate is the URI "http://www.w3.org/1999/02/22-rdf-syntax-ns#type", which specifies as the object the identifier of an OWL class of which the individual incorporating a triple with this predicate is an instance.

There are two kinds of object field of an RDF triple: a data type object field kind, and a reference object field kind. The data type object field comprises a literal value string, and optionally, a parse type string, a data type string, and a language string. The reference object field kind comprises a resource identifier that specifies either the URI of a resource, or an anonymous identifier for a resource.

An ontology comprises a set of class and individual definitions, written in a machine-processable ontology language, such as the "Web Ontology Language" OWL described in the document "OWL Web Ontology Language Overview", by D. McGuinness and F. van Harmelen, of February 2004. OWL extends the RDF model to add class, property and individual definitions. One example of an OWL ontology is the "FOAF Vocabulary Specification 0.9" by D. Brickley and L. Miller of 24 May 2007.

An OWL class definition specifies a set of properties that individuals of that class may have, as well as the relationships between that class and other classes. An OWL class is defined by a collection of one or more RDF triples in which the subject of the each of triples is the identifier of the class, and one of those triples has the predicate URI "http://www.w3.org/1999/02/22-rdf-syntax-ns#type" with the reference identifier the URI "http://www.w3.org/2002/07/owl#Class".

OWL defines four kinds of properties: object properties, datatype properties, annotation properties and ontology properties. OWL object properties connect two OWL individuals, and are defined as an instance of "http://www.w3.org/2002/07/owl#ObjectProperty". OWL datatype properties connect an OWL individual into a datatype value, and are defined as an instance of "http://www.w3.org/2002/07/owl#DatatypeProperty". OWL annotation properties provide additional descriptions in an OWL individual, class or ontology, and are defined as an instance of "http://www.w3.org/2002/07/owl#AnnotationProperty". OWL ontology properties provide additional definitions in an OWL ontology, and are defined as an instance of "http://www.w3.org/2002/07/owl#OntologyProperty".

An OWL individual is an instance of one or more OWL classes. Each individual has a resource identifier that names the individual. An OWL individual is defined by a collection of one or more RDF triples in which the subject of the triples are the identifier of the individual, and one of those triples has the predicate URI "http://www.w3.org/1999/02/22-rdf-syntax-ns#type" with the object of the reference object field kind with the reference identifier incorporating the URI of an OWL class.

SUMMARY

In enterprise computer networks, it is often necessary to translate information represented in a database or directory service from one format to another. This invention defines a method by which an ontology can be used to perform this mapping.

OBJECTS AND ADVANTAGES

One advantage of this invention over the prior art is that the translation of contents of a directory file can be directed using pattern matching of rules expressed using the Web Ontology Language (OWL).

Another advantage of this invention over the prior art is that the invention can translate between files in directory formats, such as LDIF or DSML, and files in RDF-based formats.

DRAWINGS

Figures

FIG. 2 is a diagram illustrating the contents of the state database component.

FIG. 3 is a diagram illustrating the contents of the ontology database component.

Figure 1:
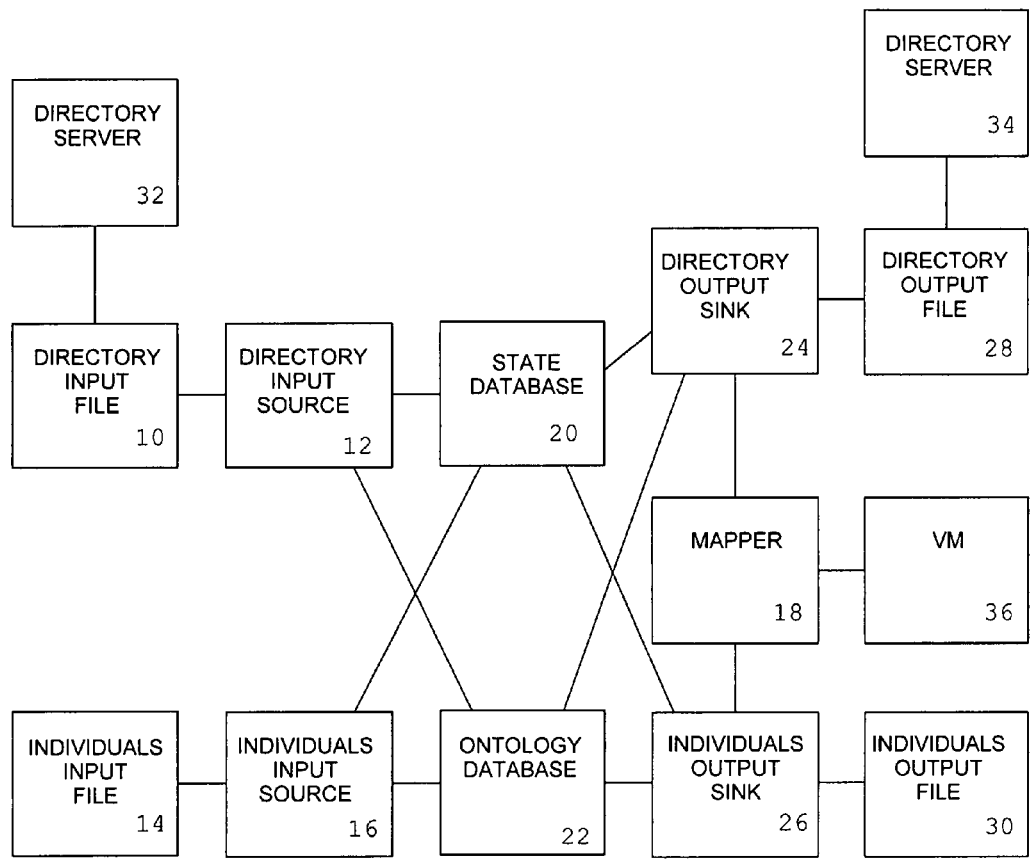
FIG. 1 is a diagram illustrating the components of the system for ontology-based translation between directory schemas.
Figure 4A:
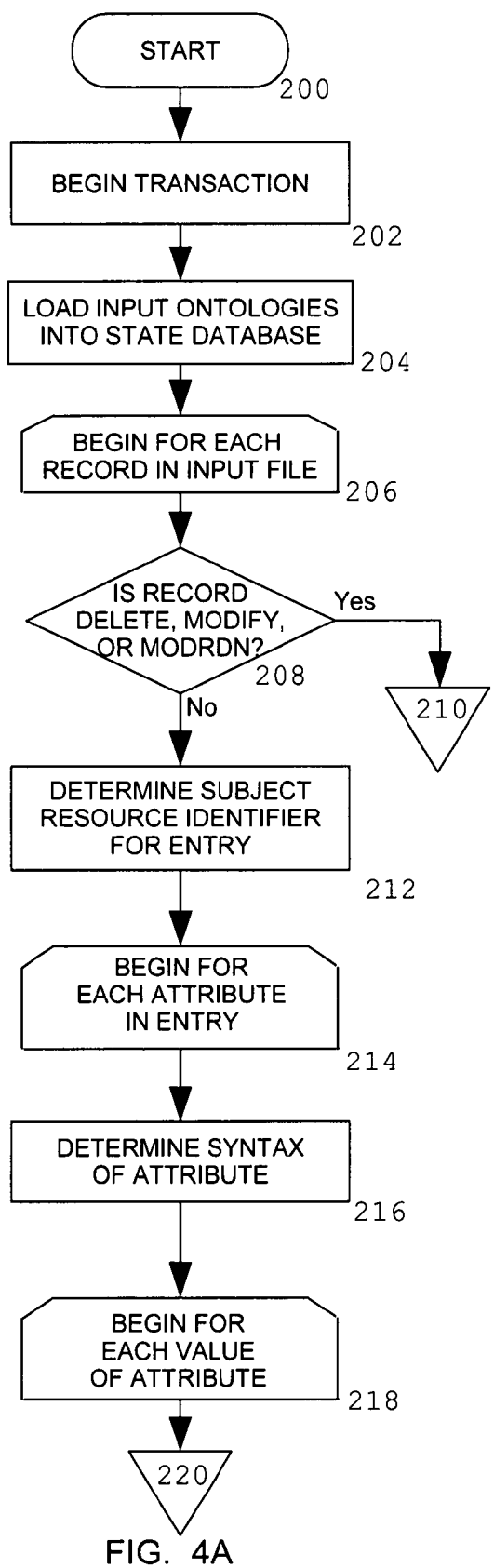
Figure 4B:
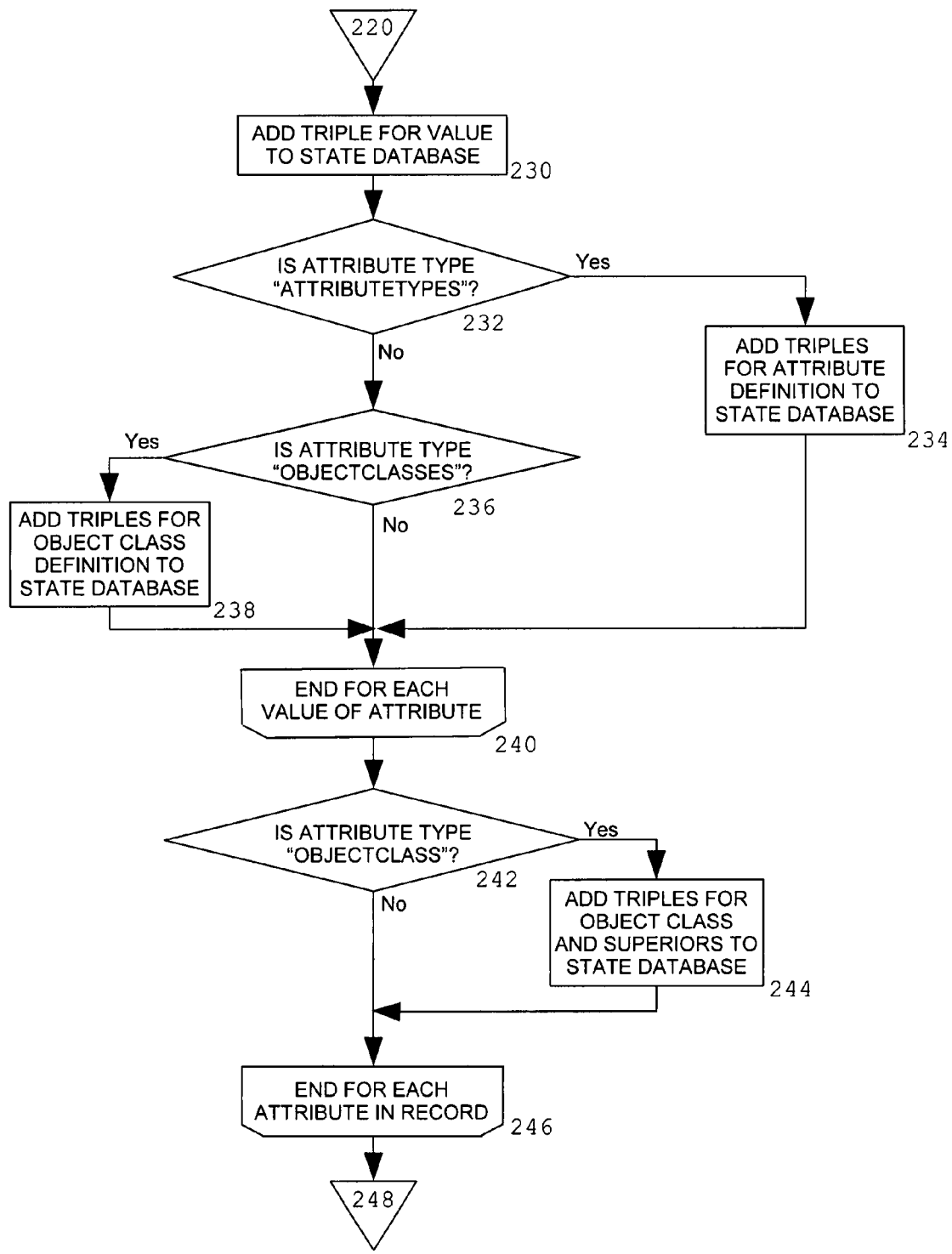
Figure 4C:
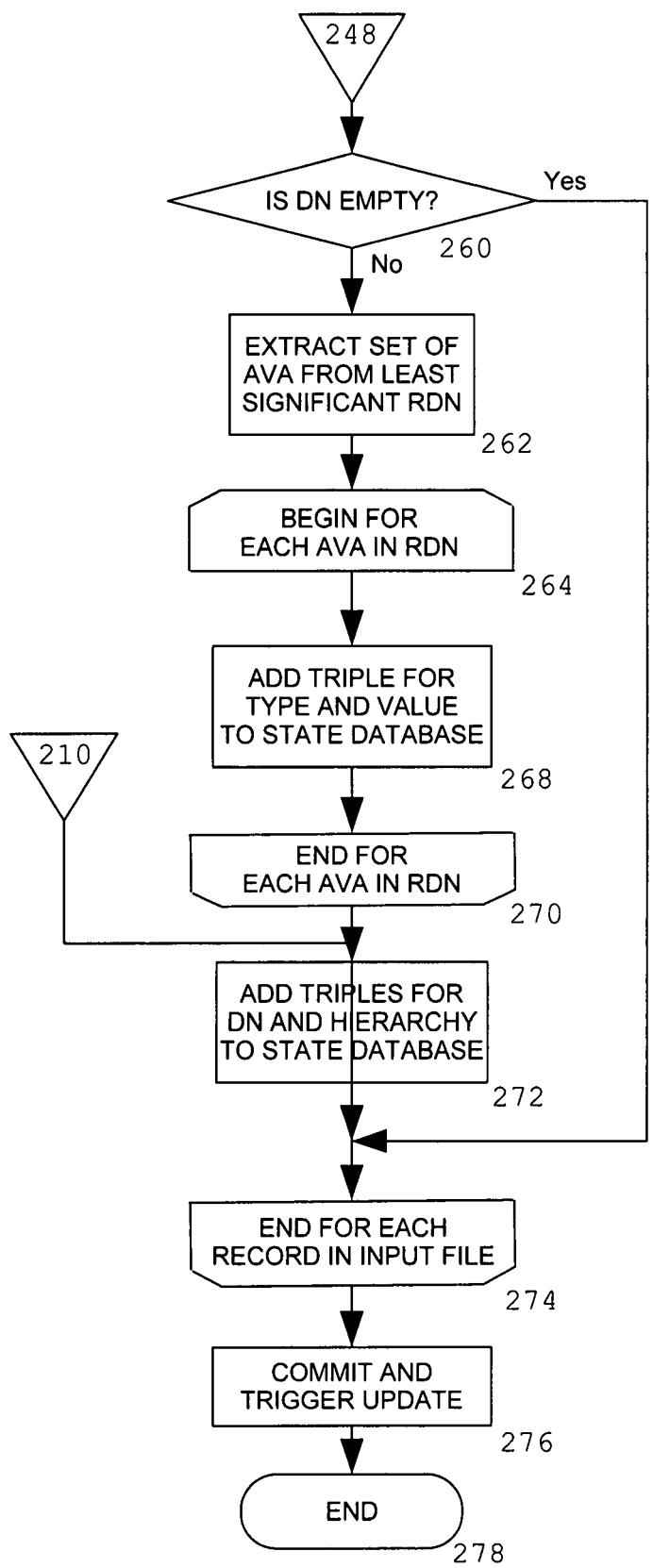
Figure 5A:
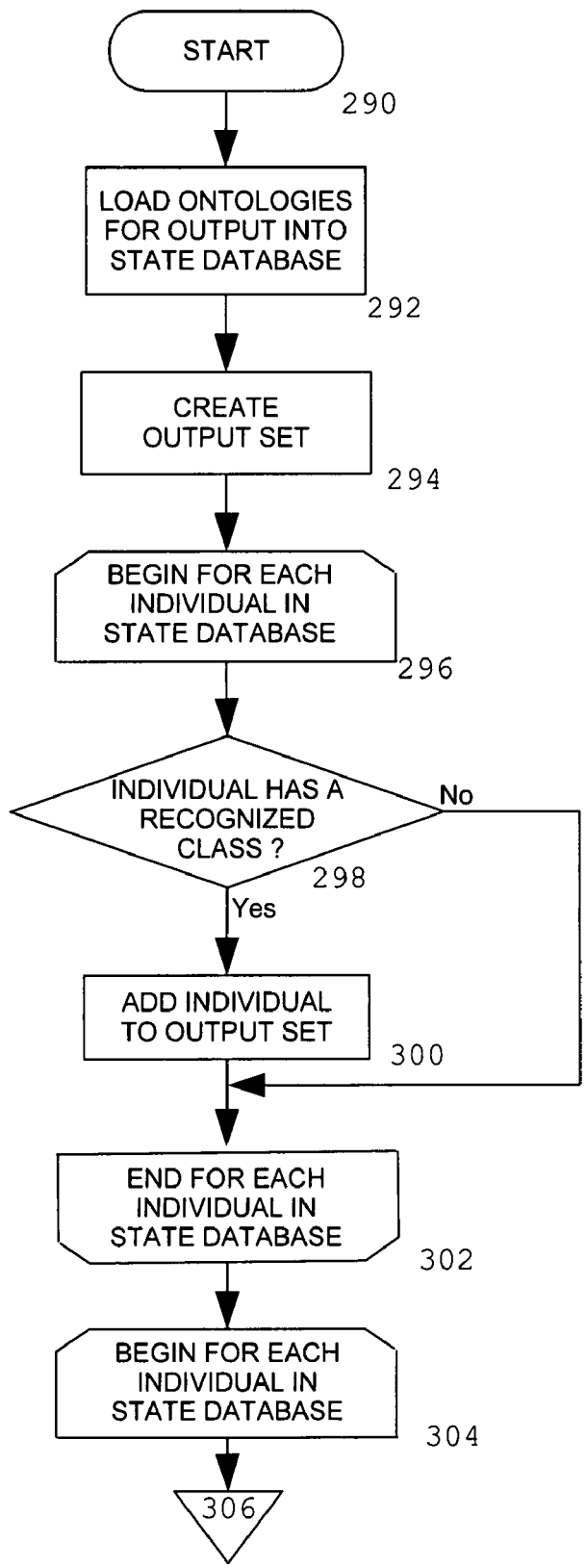
Figure 5B:
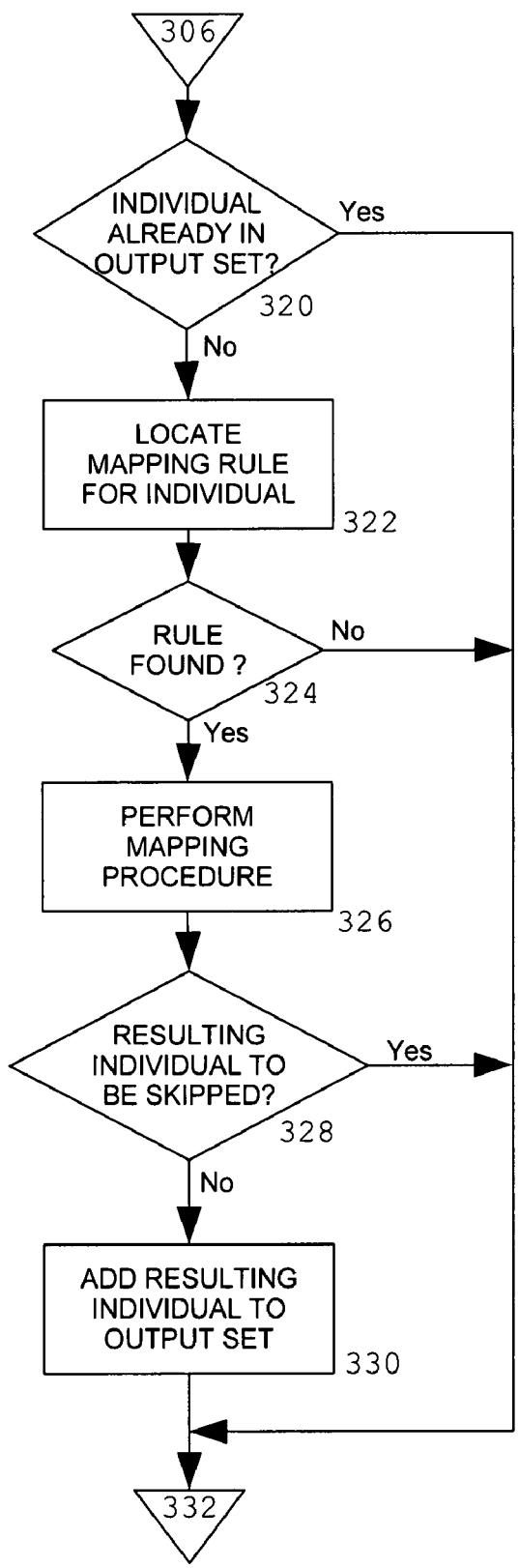
Figure 5C:
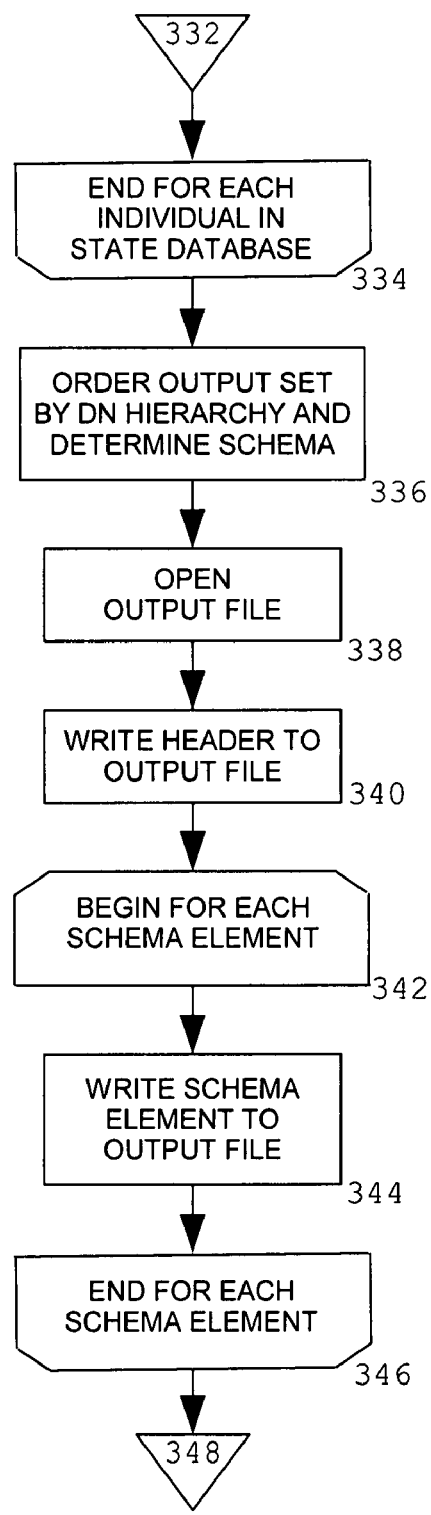
Figure 5D:
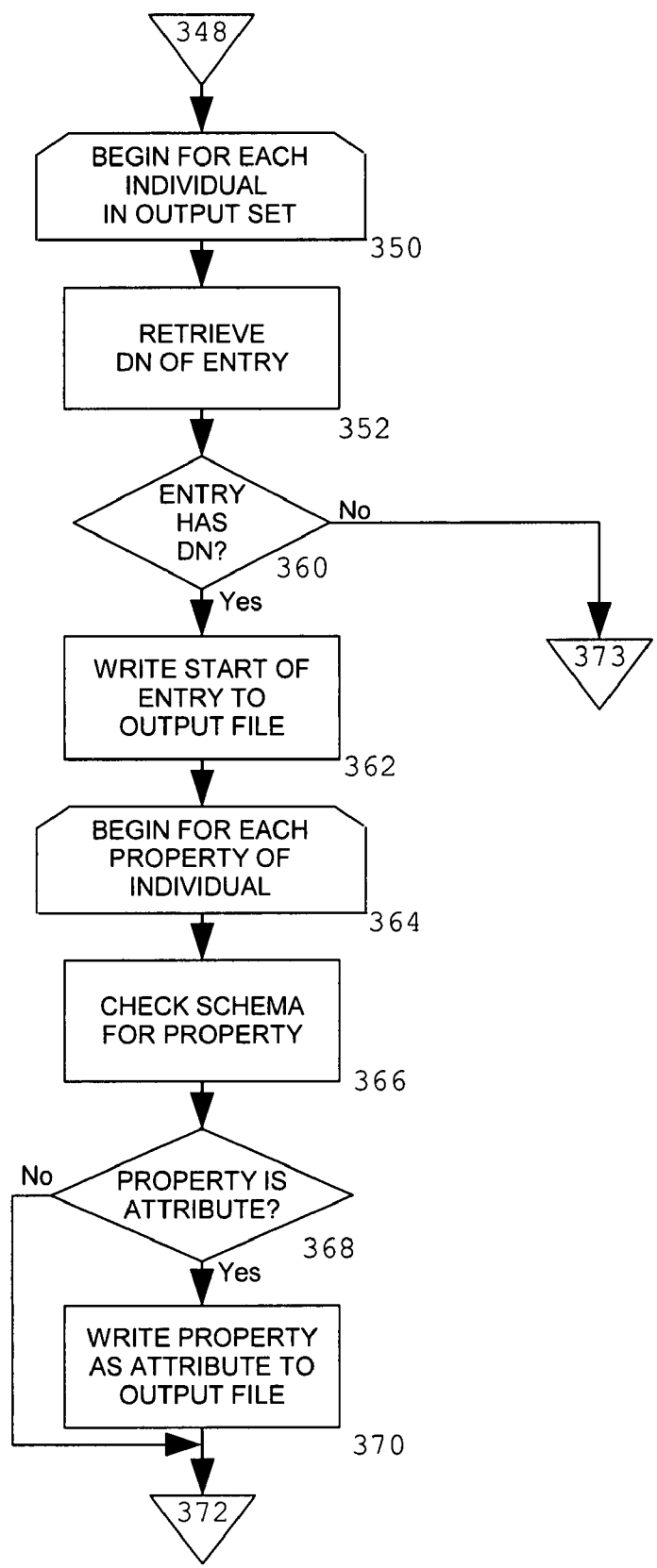
Figure 5E:
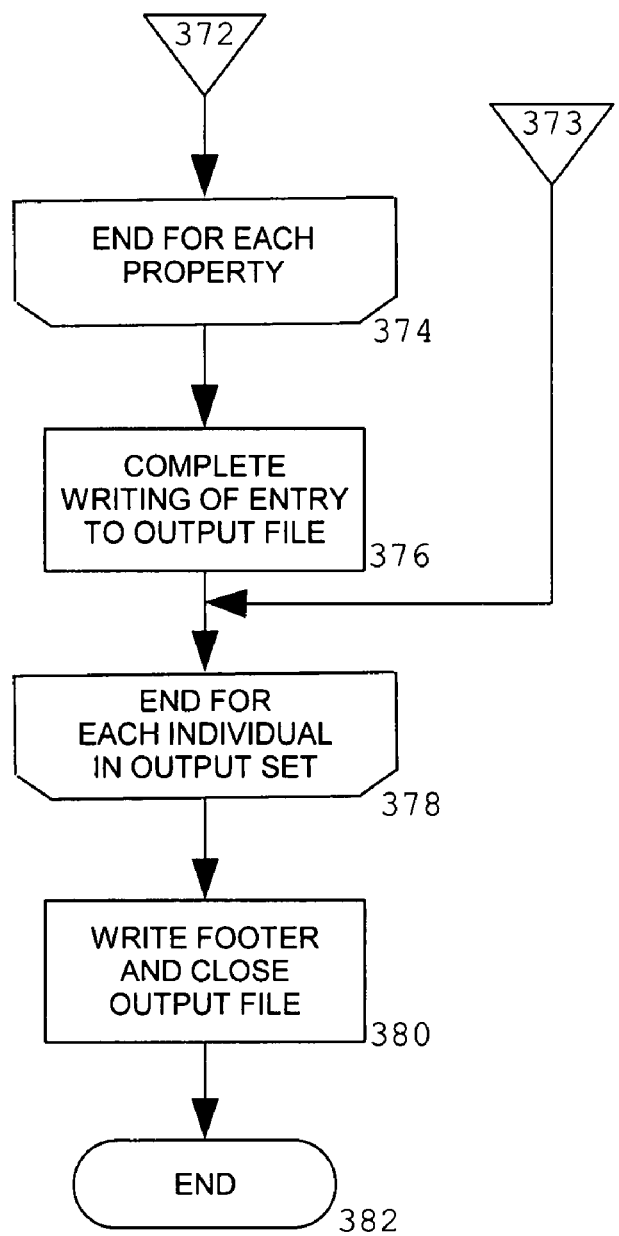

FIG. 4A, FIG. 4B, and FIG. 4C are a flowchart that illustrates the algorithm used in a directory input source component.

FIG. 5A, FIG. 5B, FIG. 5C, FIG. 5D and FIG. 5E are a flowchart that illustrates the algorithm used in a directory output sink component.

Figure 6A:
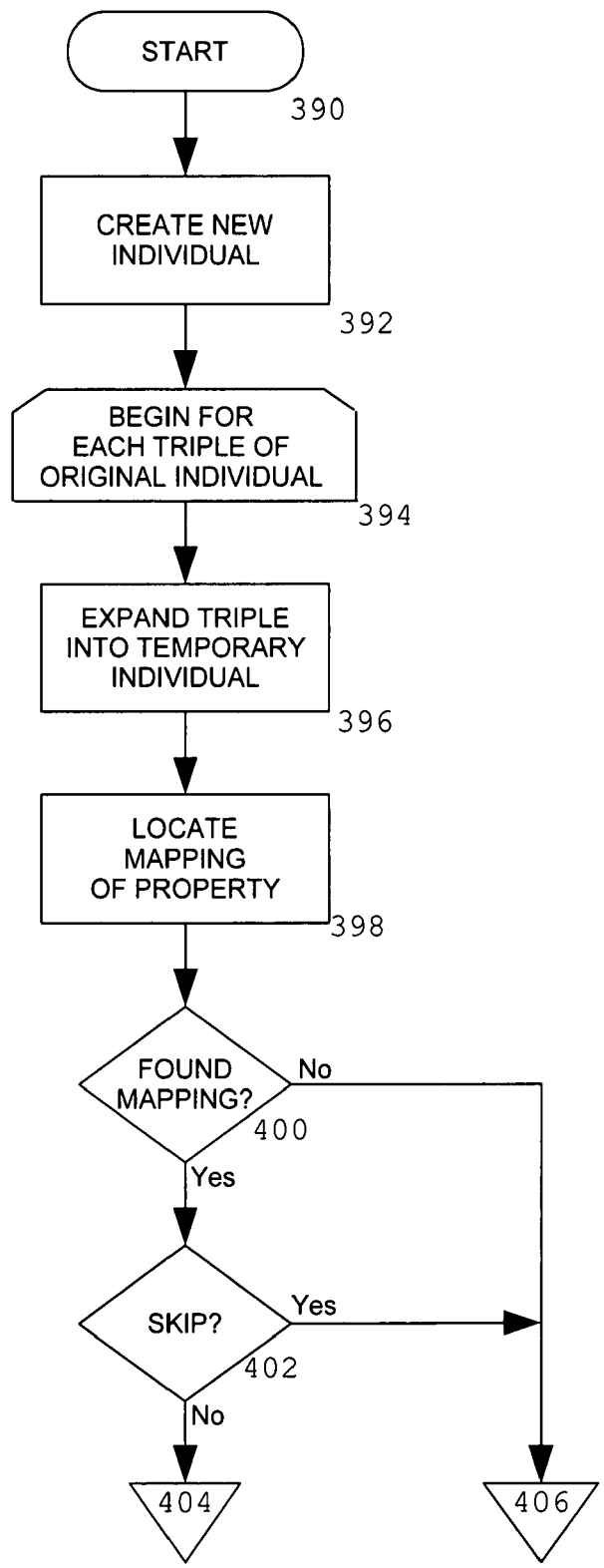
Figure 6B:
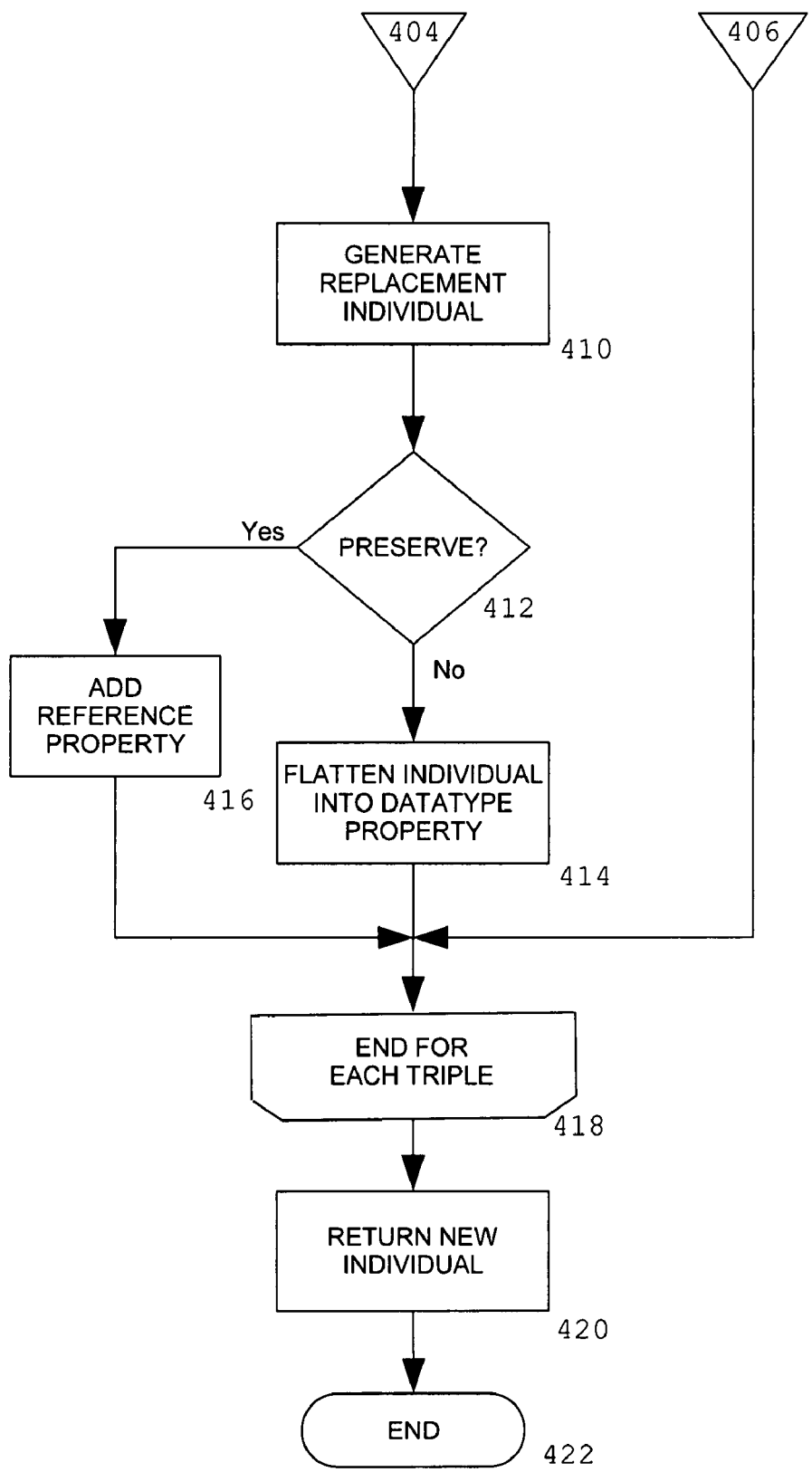

FIG. 6A and FIG. 6B are a flowchart that illustrates the algorithm used in the mapping component.

Figure 7:
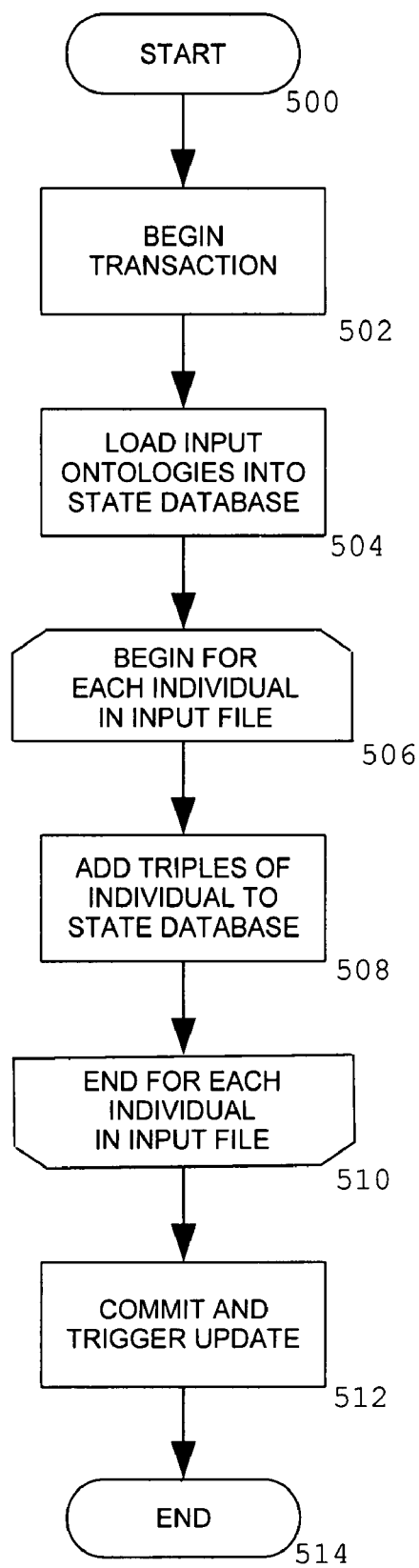
Figure 8A:
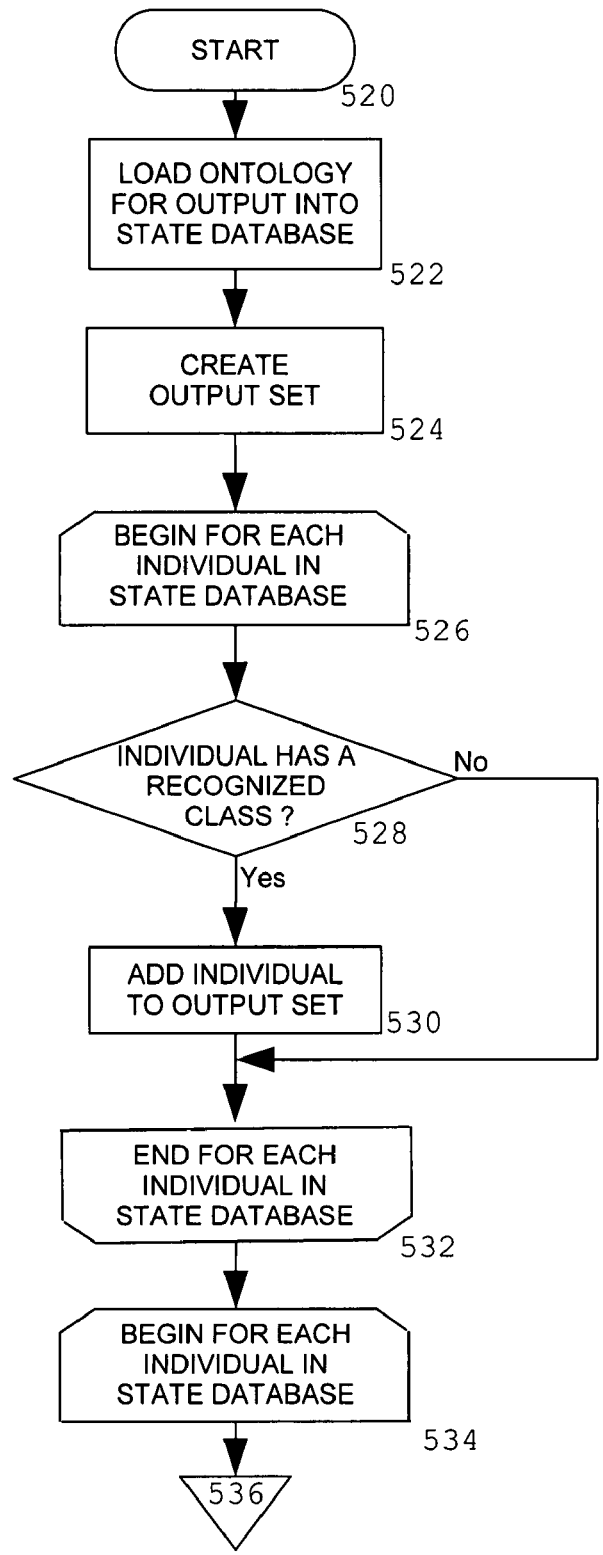
Figure 8B:
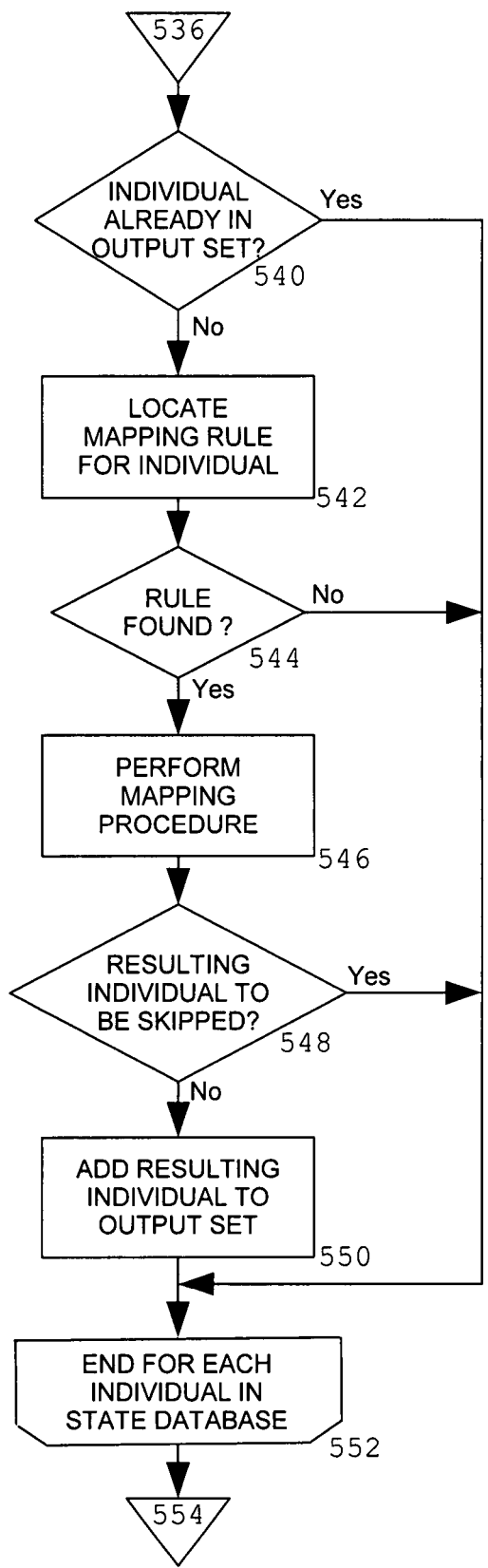
Figure 8C:
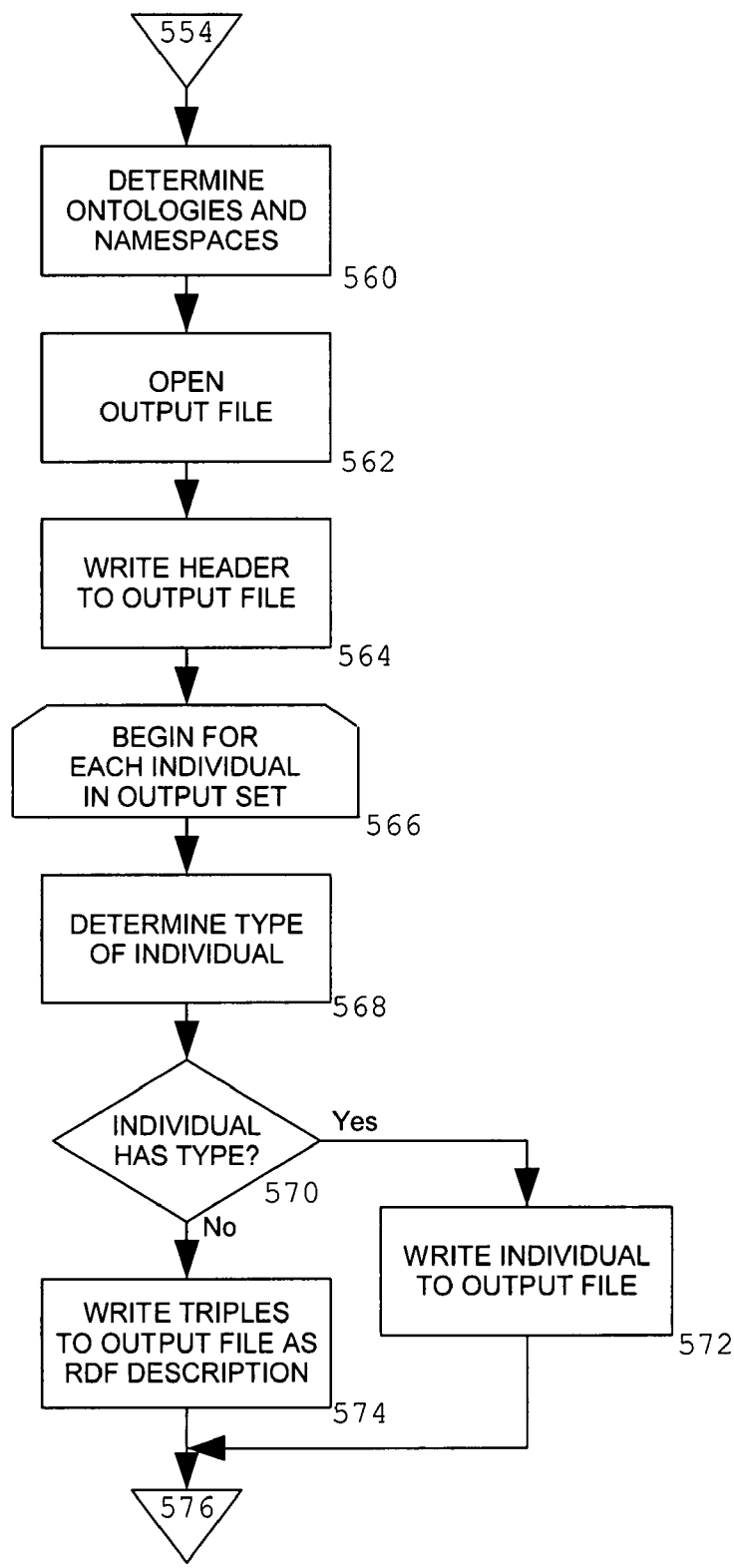
Figure 8D:
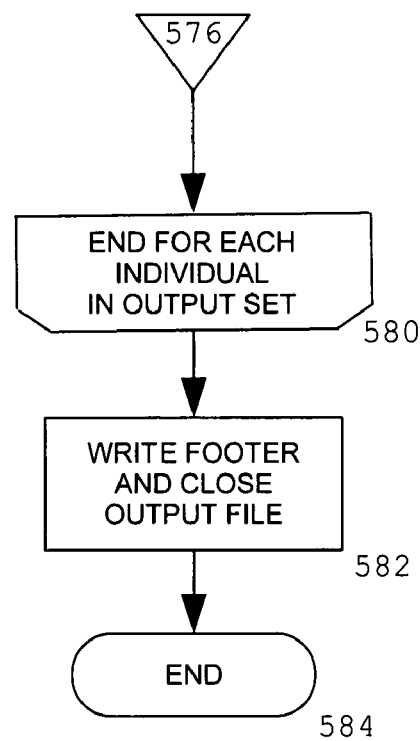

FIG. 7 is a flowchart that illustrates the algorithm used in an individual input source component.

FIG. 8A, FIG. 8B, FIG. 8C and FIG. 8D are a flowchart that illustrates the algorithm used in an individual output source.

Figure 9:
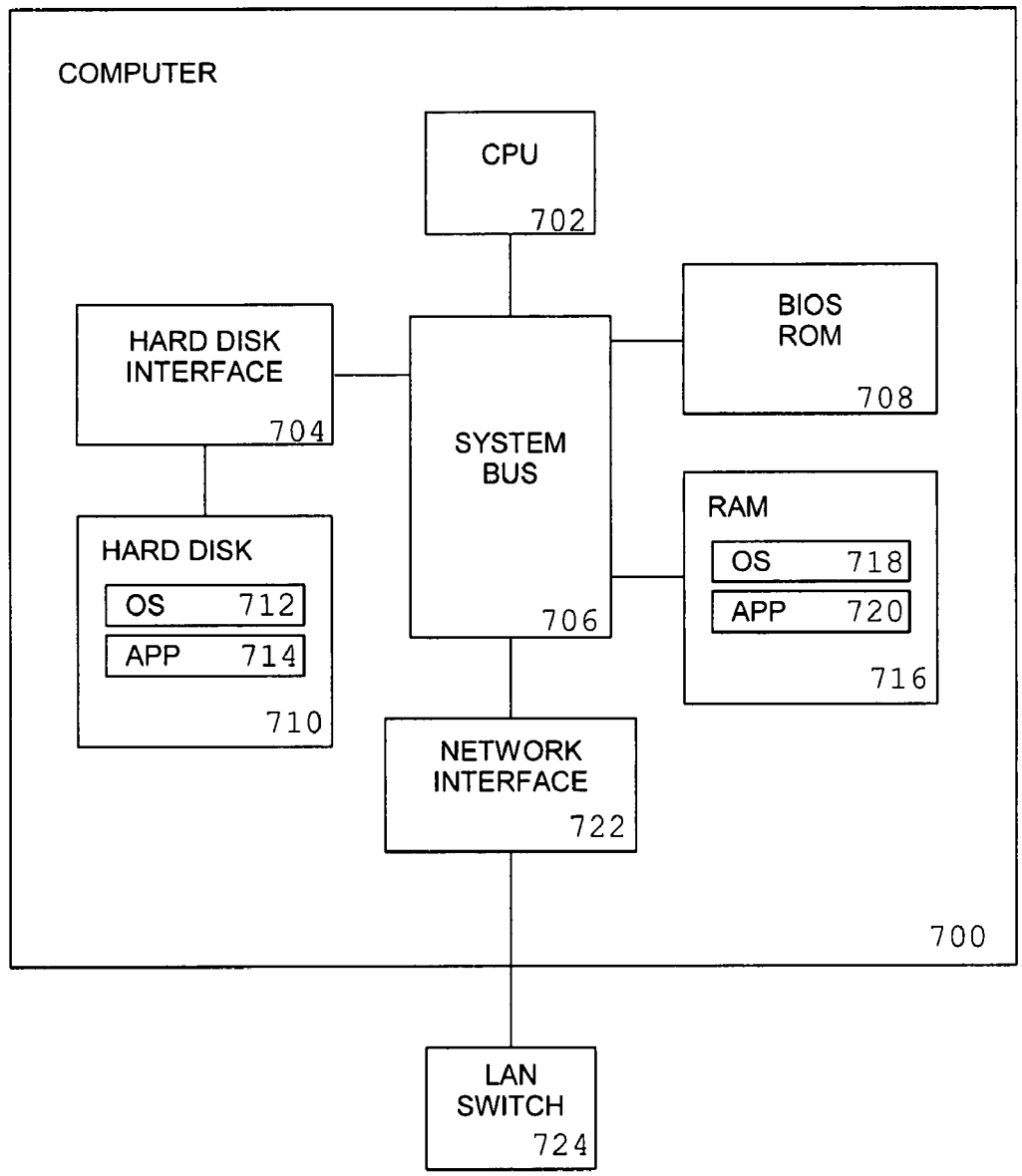

FIG. 9 is a diagram illustrating the typical components of a server computer.

FIG. 10 is a diagram illustrating the rendition in Java of a mapping function interface.

DRAWINGS

Reference Numerals 10 directory input file
12 directory input source component
14 individuals input file
16 individuals input source component
18 mapper component
20 state database component
22 ontology database component
24 directory output sink component
26 individuals output sink component
28 directory output file
30 individuals output file
32 directory server component
34 directory server component
36 virtual machine component
38 state table
42 ontology file set
44 mapping rule set table
46 mapping function set table
48 ontology database
700 computer
702 CPU
704 hard disk interface
706 system bus
708 BIOS ROM
710 hard disk
712 operating system state stored on hard disk
714 application state stored on hard disk
716 RAM
718 operating system state in memory
720 application state in memory
722 network interface
724 LAN switch
730 mapping function interface

DETAILED DESCRIPTION

The invention comprises the following components:
a directory input source component (12),
a directory output sink component (24),
one or more directory servers (32 and 34),
an individuals input source component (16),
an individuals output sink component (26),
a mapper component (18),
a state database (20),
an ontology database (22), and
a virtual machine execution environment (36).

The directory input source component (12) is a software component that reads the directory input file (10) and the ontology database (22) and updates the state database (20) with RDF triples converted from the entries read from the directory input file. The operation of this component is illustrated in FIG. 4A, FIG. 4B and FIG. 4C.

The directory output sink component (24) is a software component that reads RDF triples from the state database (20), along with ontologies and mapping rules from the ontology database (22), and uses the RDF triples to construct entries which it writes to a directory output file (28). This component leverages a mapper component (18) to perform mapping of individuals to a specific directory schema. The operation of this component is illustrated in FIG. 5A, FIG. 5B, FIG. 5C, FIG. 5D and FIG. 5E.

The individuals input source component (16) is a software component that reads records corresponding to individuals from an RDF input file (14), converts these individuals into RDF triples, and stores them in the state database (20). The operation of this component is illustrated in FIG. 7.

The individuals output sink component (26) is a software component that reads RDF triples from the state database (20), along with ontologies and mapping rules from the ontology database (22) and uses the RDF triples from the state database to construct individuals, which it writes to an RDF output file (30). This component leverages a mapper component (18) to perform mapping of individuals to a specific directory schema. The operation of this component is illustrated in FIG. 8A, FIG. 8B, FIG. 8C and FIG. 8D.

The mapper component (18) is a software component which performs a mapping of a set of RDF triples representing an individual from one schema to another schema. The operation of this component is illustrated in FIG. 6A and FIG. 6B.

The state database component (20) comprises a state table (35). The state table comprises a set of zero or more RDF triples, which store the current state of the translation of a directory file or individuals file to another schema. A state database may be implemented as a centralized database, such as a relational database, in which the state table is a single table with three columns: subject, predicate and object. Alternatively, a state database may be implemented as a distributed database service, in which each input source maintains the triples read from its input file, and the state database distributes queries across all the input sources. FIG. 2 provides an example of the contents of a state table (35), in which there are two individuals represented: one with subject resource identifier of the URI kind "file://f#uid=p1", and the other with subject resource identifier of the anonymous kind "src=ss1; node=n1".

The ontology database component (22) comprises a set of files in an ontology language, such as OWL, a set of mapping rules, and a set of mapping functions.

Each file in the ontology file set (42) stores one ontology describing either the data formats of the input sources and output sinks, the schema used by a directory input source or output sink, or the classes and properties of the individuals in an individuals input source or output sink. A file is represented as a row in the ontology file set table (42). The ontology file set table has three columns: KEY, URI and DEFINITIONS. A value in the KEY column forms a unique identifier for the ontology file. A value in the URI column is the URI for the ontology. A value in the DEFINITIONS column is the string encoding of the ontology, typically expressed as an RDF/XML document.

Each mapping rule is represented as a row in the ontology database mapping rule set table (44), and describes the transformation of an individual from one class to another. The mapping rule has a source class parameter URI, a destination class parameter URI, and an information field. The ontology database mapping rule set table (44) has three columns: SOURCE CLASS, DEST CLASS and INFO. A value in the SOURCE CLASS column is the source class parameter URI of the mapping rule. A value in the DEST CLASS column is the destination class parameter URI of the mapping rule. A value in the INFO column provides further information to mapping functions.

Each mapping function is represented as a row in the ontology database mapping function set table (46), and describes the mapping of a temporary individual to another class. A mapping function implements an interface which comprises a set of methods, including a method to determine whether the individual is to be skipped, a transformation method that receives as input a temporary individual and returns a replacement individual, and a method to determine whether the replacement individual is to be flattened into a property. An example of the interface expressed in the Java language is shown in FIG. 10. A mapping function could be implemented as bytecodes in a compiled bytecode language, such as Java, as bytecodes in the Microsoft Intermediate Language generated by compiling a function written in a .NET compatible language such as C#, or as text of a program written in a scripting language, such as Tcl. The ontology database mapping function set table (46) has four columns: SOURCE CLASS, DEST CLASS, VM and IMPL. A value in the SOURCE CLASS column comprises the URI of the OWL class of the temporary individual. A value in the DEST CLASS column comprises the URI of the OWL class of the replacement individual. A value in the VM column identifies the virtual machine environment in which the mapping function is implemented. A value in the IMPL column comprises the implementation of the mapping function interface.

The virtual machine execution environment component (36) is a software component which is used by the mapper component (18) to execute mapping functions. Examples of implementations of a virtual machine execution environment include the Sun Java Runtime Environment (JRE) or the Microsoft Common Language Runtime (CLR).

The processing components of this invention can be implemented as application software running on one or more server computer systems on an enterprise network.

FIG. 9 illustrates the typical components of a server computer (700). Components of the computer include a CPU (702), a system bus (706), a hard disk interface (704), a hard disk (710), a BIOS ROM (708), random access memory (716), and a network interface (722). The network interface connects the computer to a local area network switch (724). The hard disk (710) stores the software and the persistent state of the operating system (712) and applications (714) installed on that computer. The random access memory (716) holds the executing software and transient state of the operating system (718) and application processes (720).

Operations

The process of translation of directory information from one schema or format to another in based on the conversion of the directory information from the input schema to a common representation as a set of RDF triples in the state database, followed by the conversion of these triples to the output schema. When an input source (12, 16) completes reading of an input file (10, 14), it triggers an output sink (24, 26) to start a thread to traverse the state database (20) to generate an output file (28, 30).

A directory input source component (12) is responsible for reading entries from a directory input file (10), and converting these entries into RDF triples to be placed into a state database (20). This component has a single thread of processing, and this thread follows the algorithm described in FIG. 4A, FIG. 4B and FIG. 4C. At step 202, the thread will start a new transaction. At step 204, the thread will load an ontology into the state database that represents the input file format, such as an ontology for the LDIF format for directory entries, and will load an ontology for the standard classes used in that file format. For the LDIF format, the ontology for the standard classes will add OWL class and property definitions for each of the directory schema attributes and object classes included in the documents "Lightweight Directory Access Protocol (LDAP): Directory Information Models" by K. Zeilenga of June 2006, and "Lightweight Directory Access Protocol (LDAP): Schema for User Applications", by A. Sciberras of June 2006. At step 206, the thread will iterate through each record in the input file. If the record is not an entry record or a record for adding an entry, then at step 208 the thread will skip processing of that record, and continue with the next record. At step 212, the thread will determine the subject resource identifier of the entry. If the input file is LDIF or DSML, the hostname of the directory server which generated the file is known by the thread, and the LDAP port number of that directory server is known by the thread, the resource identifier will be of the URI form with a Uniform Resource Identifier of either the "ldap" or "ldaps" scheme and including the hostname and TCP port number of the directory server and the distinguished name of the entry. If the hostname or port number of the directory server is not known by the thread, then the resource identifier will be of the URI form with a Uniform Resource Identifier of the "file" scheme, including the name of the directory input file, and attaching the distinguished name of the entry as a fragment. At step 214, the thread will iterate through each attribute in the entry. At step 216, the thread will search the state database for the schema of the attribute type to determine the URI for the attribute type. If the attribute type is of the OBJECT IDENTIFIER form, then the thread will search for a triple in the state database in which the predicate is the URI "http://www.ldap.com/1/schema/ldapv3.owl#AttributeType_Numericoid" and the object of the triple is a data type incorporating a string which matches for equality the attribute type. Otherwise, if the attribute type is not of the OBJECT IDENTIFIER form, then the thread will search for a triple in the state database in which the predicate is the URI "http://www.ldap.com/1/schema/ldapv3.owl#AttributeType_Name" and the object of the triple is a data type incorporating a string which matches for equality the attribute type. If the thread locates one matching triple in the state database, then the URI for the attribute type is set to be the subject of that triple. If one triple was not found in the state database, then the URI for the attribute type is set to be the URI of the resource identifier of the entry, with the fragment replaced by the string "AttributeType_" concatenated with the attribute type string. At step 218, the thread will traverse each value of the attribute. At step 230, the thread will add a triple to the state table in the state database for the value. The thread will set the subject resource identifier of the triple to be the resource identifier for the entry. The thread will set the predicate of the triple to be the URI for the attribute type determined in step 216. The thread will set the object of the triple to be a data type field, incorporating the attribute value. If the value is base64-encoded in the input, then the thread will set the object in the triple to be a base64-encoding of the binary attribute value with a datatype URI of "http:// www.w3.org/2001/XMLSchema#base64binary", otherwise, the object in the triple will be set to a literal with the string attribute value.

When parsing attributes from an LDAP or DSML directory input file, certain attribute types defined in LDAP trigger special handling in a directory input source component. At step 232, if a value being parsed is a value of the attribute named "attributeTypes", then at step 234 the thread will add additional triples to the state database which encodes the schema of the attribute type being defined. The subject of these triples will be the URI from the resource identifier of the entry, with the fragment replaced with the string "Attribute-Type_" concatenated with the numeric OID of the attribute type being described in the attribute value. The thread will add a triple to the state database, in which the predicate of the triple is set to the URI "http://www.ldap.com/1/schema/ldapv3.owl#AttributeType_Numericoid" and the object of the triple is set to a string comprising the numeric OID of the attribute type being described. For each attribute name in the attribute type being described, the thread will add a triple to the state database, in which the predicate is set to the URI "http://www.ldap.com/1/schema/ldapv3.owl#AttributeType_Name" and the object of the triple is set to be of the data type kind and comprise a string name of the attribute type being described. The thread will add a triple to the state database, in which the predicate is set to the URI "http://www.w3.org/1999/02/22-rdf-syntax-ns#type" and the object is set to be of the reference object field kind with the reference identifier URI set to the URI "http://www.w3.org/2002/07/owl#DatatypeProperty". At step 236, if the value being parsed is a value of the attribute named "objectClasses", then at step 238 the thread will add additional triples to the state database which encodes the schema of the object class being defined. The subject of these triples will be set to be the URI from the resource identifier of the entry, with the fragment replaced with the string "Object-Class_" concatenated with the numeric OID of the object class being described. The thread will add a triple to the state database, in which the predicate is set to be the URI "http://www.ldap.com/1/schema/ldapv3.owl#ObjectClass_Numericoid" and the object of the triple is set to be the numeric OID of the object class being described. For each superior object class of the object class being described, the thread will add a triple to the state database, in which the predicate is set to be the URI "http://www.ldap.com/1/schema/ldapv3.owl#ObjectClass_Superior" and the object of the triple is set to be of the data type kind and comprise a string name of the superior of the object class being described. For each object class name in the object class being described, the thread will add a triple to the state database, in which the predicate is set to be the URI "http://www.ldap.com/1/schema/ldapv3.owl#ObjectClass_Name" and the object of the triple is set to be of the data type kind and comprise a string name of the object class being described. The thread will add a triple to the state database, in which the predicate is set to be the URI "http://www.w3.org/1999/02/22-rdf-syntax-ns#type" and the object is set to be of the reference object field kind with the reference identifier URI set to "http://www.ldap.com/1/schema/ldapv3.owl#ObjectClass".

If the attribute being added is named "objectClass", then at step 244 the thread will add additional triples to the state database to encode superior object classes of the object classes of the entry that were not listed in the entry, if any. The thread will create an empty set of additional object classes. For each value of the objectClass attribute, the thread will search the state database for a triple in which the predicate matches the URI "http://www.ldap.com/1/schema/ldapv3.owl#ObjectClass_Name" and the object matches for equality with the value of the objectClass attribute. If a triple is found, then the thread will search the state database for a set of triples in which the predicate of a triple matches the URI "http://www.ldap.com/1/schema/ldapv3.owl#ObjectClass_Superior" and the subject of the triple is the same as the triple that was found. For each triple in the set of triples, the thread will extract the string value of the object field, and if this string does not match for equality any of the values of the objectClass attribute of the entry and does not match for equality any of the names of object classes in the set of additional object classes, the string will be added to the set of additional object classes. For each object class name in the set of additional object classes, the thread will add a triple to the state database. The subject resource identifier of the triple being added will be the resource identifier for the entry. The predicate of these triples will be the URI "http://www.ldap.com/1/schema/rfc4512.owl#AttributeType_2.5.4.0". The object of the triple will be a data type field, comprising the object class name.

At step 260, the thread will determine whether the distinguished name is empty. If the distinguished name of an entry is not empty, then at step 262 the thread will extract the set of attribute value assertions from the least significant relative distinguished name component of the distinguished name, and at step 268 the thread will add a triple to the state database for each of the attribute value assertions, to ensure that these values are represented in the state database, even if these are not present as attribute values in the entry. If the attribute type in the attribute value assertion is of the OBJECT IDENTIFIER form, then the thread will search for a triple in the state database in which the predicate matches the URI "http://www.ldap.com/1/schema/ldapv3.owl#AttributeType_Numericoid" and the object of the triple is of the data type kind and matches for equality the attribute type. Otherwise, if the attribute type in the attribute value assertion is not of the OBJECT IDENTIFIER form, then the thread will search for a triple in the state database in which the predicate matches the URI "http://www.ldap.com/1/schema/ldapv3.owl#AttributeType_Name" and the object of the triple is of the data type kind and matches for equality the attribute type. If one triple is found in the state database from either search, then the URI for the predicate for the triple being added is the subject of the triple found in the search. If one triple was not found in the state database, then the URI for the triple being added is set to the URI of the resource identifier of the entry, with the fragment replaced by the string "AttributeType_" concatenated with the attribute type string. The object of the triple being added is set to be of the data type kind, with a literal with the string attribute value from the attribute value assertion.

At step 272 the thread will add a triple to the state database to encode the distinguished name of the entry. The subject resource identifier of the triple will be set to the resource identifier for the entry, the predicate of this triple will be set to the URI "http://www.ldap.com/1/schema/ldapv3.owl#Entry_DN", and the object will be set to be of the data type kind with the value set to the string of the distinguished name. The thread will add a triple to the state database to encode the RDF type of the entry. The subject resource identifier of the triple will be set to the resource identifier for the entry, the predicate of this triple will be set to the URI "http://www.w3.org/1999/02/22-rdf-syntax-ns#type", and the object of the triple will be set to be of the reference object field kind with the reference identifier URI "http://www.ldap.com/1/schema/ldapv3.owl#Entry". The thread will also add zero or more triples to the state database to encode the hierarchy of the entry, one for each level of hierarchy above the entry parsed from the file. In each of these triples the subject resource identifier of the triple will be set to the resource identifier for the entry, the predicate will be set to the URI "http://www.ldap.com/1/schema/ldapv3.owl#Entry_Hierarchy", and the object in each triple will be set to be of the reference object field kind with a URI of a superior entry (in the distinguished name hierarchy) of the entry being parsed. For example, if the entry being parsed has a distinguished name of "cn=person, ou=People, o=Company", then at this step two triples would be generated with the predicate set to the URI "http://www.ldap.com/1/schema/ldapv3.owl#Entry_Hierarchy": one triple would have an object with a reference identifier URI that comprises the distinguished name "ou=People, o=Company", and the other would have an object with a reference identifier URI that comprises the distinguished name "o=Company".

At step 276, the thread will commit the change it has made to the state database, and trigger any output sinks to read the state database.

A directory output sink component (24) is responsible for converting RDF triples from the state database to construct entries in a directory output file (28). This component has a single thread of processing, and this thread follows the algorithm described in FIG. 5A, FIG. 5B, FIG. 5C, FIG. 5D and FIG. 5E. At step 292, the thread will load an ontology into the state database which represents the output format, e.g., an ontology describing the LDIF format. At step 294, the thread will create an empty output set of individuals. At step 296, the thread will iterate through each individual in the state database (20). At step 298, the thread will test whether one or more of the individual's OWL classes is natively recognized by the output format, by searching for a triple of that individual in which the predicate is the URI "http://www.w3.org/1999/02/22-rdf-syntax-ns#type" and the object is of the reference object field kind and the reference identifier URI matches the URI "http://www.ldap.com/1/schema/ldapv3.owl#Entry". If the individual's ontology class is one that is natively recognized by the output format, then at step 300 the thread will add the individual to the output set. At step 304, the thread will again traverse the state database, and for those individuals which have not already been added to the output set, the thread will attempt to locate a mapping rule in the ontology database. At step 322, the thread will search the ontology database for a mapping rule in which the source class of the mapping rule matches one of the OWL classes named as an object of the "http://www.w3.org/1999/02/22-rdf-syntax-ns#type" predicate of the individual, and the destination class of the mapping rule matches the URI "http://www.ldap.com/1/schema/ldapv3.owl#Entry". If no mapping rule is found, then at step 324 the thread will skip this individual. Otherwise, the thread at step 326 will provide the individual and the mapping rule to the mapping component, and will receive back a resulting individual. At step 328, if the thread determines that the resulting individual is not of an appropriate class to be included in the output, then the thread will not add the resulting individual to the output set. Otherwise, at step 330 the resulting individual is added to the output set. At step 336, the thread will sort the individuals in the output set by distinguished name hierarchy. The thread will use in the sorting operation a comparison function for a pair of individuals. The comparison function will search the triples of each of the two individuals provided as input for a triple in which the predicate matches the URI "http://www.ldap.com/1/schema/ldapv3.owl#Entry_DN". If at least one of the two individuals does not have a single triple with that predicate, then the two individuals are incomparable. Otherwise, if both individuals have a triple with that predicate, then the function will extract the string value of the object of each triple, and compare the cardinality of the set of relative distinguished names in one individual's distinguished name with the cardinality of the set of relative distinguished names in the other individual's distinguished name. At step 338, the thread will open output file for writing. At step 340, the thread will write a header to the output file. If the file format is LDIF, then the thread will write a header that is a line with the text "version: 1", followed by an empty line, followed by a line with the text "cn=subschema". If the file format is DSML, then the thread will write a header of a line with text "<?xml version="1.0"?>", followed by a line with the XML element "<dsml xmlns="http://www.dsml.org/DSML">", followed by a line with the XML element "<directory-schema>". At step 342, the thread will iterate through each schema element definition in the state database. A schema element definition is a collection of one or more RDF triples with the same subject, and one of the triples in the collection has the predicate URI "http://www.w3.org/1999/02/22-rdf-syntax-ns#type" and the object of the reference object field kind with the reference identifier URI matching the URI "http://www.w3.org/2002/07/owl#DatatypeProperty" or "http://www.ldap.com/1/schema/ldapv3.owl#ObjectClass". At step 344, depending on the output format, the schema description will be written to the output. If the file format is LDIF, then the thread will write the schema element as an attribute type and value, in which the attribute type is either "attributeTypes" or "objectClasses", and the value is encoded as described in the document "Lightweight Directory Access Protocol (LDAP): Directory Information Models" by K. Zeilenga of June 2006. If the file format is DSML, then the thread will write the schema element as a sequence of XML elements beginning with an XML element "<attribute-type>" or <class>", as described in the document "Directory Services Markup Language (DSML)", by J. Tauber, T. Hay, T. Beauvais, M. Burati, and A. Roberts, of December 1999. At step 346, the thread will complete iterating through the schema elements. If the file format is LDIF, then the thread will write an empty line. If the file format is DSML, then the thread will write a line with the XML elements "</directory-schema><directory-entries>". At step 350, the thread will iterate through each individual in the output set. At step 352, the thread will determine if an entry has a distinguished name, by searching for a triple in which the predicate is "http://www.ldap.com/1/schema/ldapv3.owl#Entry_DN". If the entry does not have a distinguished name, then at step 360 it is skipped. At step 362, the thread will write the start of the entry to the output file. If the file format is LDIF, then the thread will write a line which comprises the text "dn:" concatenated with the distinguished name of the entry. If the file format is DSML, then the thread will write an XML element "<entry>" with attribute "dn" having as its value the distinguished name of the entry. At step 364, the thread will iterate through each of the properties of the individual. At step 366, the thread will search the state database for the schema for the property, by searching for one or more triples in which the subject of the triple matches the predicate URI of the property, and the predicate of the triple matches either the URI "http://www.ldap.com/1/schema/ldapv3.owl#AttributeType_Name" or the URI "http://www.ldap.com/1/schema/ldapv3.owl#AttributeType_Numericoid". At step 368, the thread will test whether the property describes a directory attribute. If the property does not describe a directory attribute, as no triples were found when searching the state database for schema, then the property is skipped. Otherwise, at step 370, the thread will write the property as an attribute to the output file. The string to be used as the attribute type name will be the value of the triple in the schema for the property which matched the predicate URI "http://www.ldap.com/1/schema/ldapv3.owl#AttributeType_Name", or if no triples of that predicate were found, a triple in the schema for the property which matched the predicate URI "http://www.ldap.com/1/schema/ldapv3.owl#AttributeType_Numericoid". If the file format is LDIF, then the thread will write to the output file for each value of the property the pair of the string to be used as the attribute type name, and a string encoding of the value of the property, constructed from the object field of the RDF triple representing the value of the property. If the file format is DSML and the attribute type name to be used matches the string "objectClass", then the thread will write to the output file an XML element "<objectclass>", followed by one or more XML elements "<oc-value>OBJECTCLASS</oc-value>" in which there is one set of elements for each value of the property and the string OBJECTCLASS is replaced by the string encoding of the value of the property, constructed from the object field of the RDF triple representing the value of the property, followed by an XML element "</objectclass>". If the file format is DSML and the attribute type name to be used does not match the string "objectClass", then the thread will write to the output file an XML element "<attr>" with XML attribute "name" with the value comprising the attribute type name to be used, followed by one or more XML elements "<value>VAL</value>" in which there is one set of elements for each value of the property and the string VAL is replaced by the string encoding of the value of the property, constructed from the object field of the RDF triple representing the value of the property, followed by an XML element "</attr>". After traversing all the properties, at step 376 the thread will complete the writing of the entry to the output file. If the file format is LDIF, then the thread will write an empty line. If the file format is DSML, then the thread will write a line comprising the XML element "</entry>". At step 380, after all the individuals in the output set have been traversed, the thread will write a footer to the output file, and close the output file. If the file format is DSML, then the thread will write as the footer a line comprising the XML elements "</directory-entries></dsml>".

A mapping component (18) is responsible for performing the mapping of an individual from one schema to another. The algorithm used by this component is illustrated in FIG. 6A and FIG. 6B. This component is used by an output sink when processing an individual obtained from the state database which is not of a class that is natively supported by the output format. This component has a single thread of processing, and is started by an output source, which provides to the thread an input individual and the URI of the default class of the output format. An example of the default class of the output format is that named by the URI "http://www.ldap.com/1/schema/ldapv3.owl#Entry", for a directory output sink. At step 392, the thread will create an empty result individual of the default class of the output format. At step 394, the thread will iterate through each triple of the input individual. At step 396, the thread will expand the triple of the input individual into a new temporary individual. The resource identifier of the triples of this temporary individual will be set to an anonymous form with a generated unique string, relative to the input source from which the source input individual was constructed. The thread will add a triple to the temporary individual in which the predicate is set to the URI "http://www.w3.org/1999/02/22-rdf-syntax-ns#type" and the object is set to be of the reference kind with a reference identifier URI of the predicate of the triple of the input individual. If the object of the triple of the input individual is of the data type object field kind, then the thread will add a triple to the temporary individual in which the predicate is set to the URI "http://www.ldap.com/1/schema/mapping.rdf#literal" and the object is set to be of the data type object field kind and the contents of the object copied from the triple of the input individual, otherwise the thread will ad a triple to the temporary individual in which the predicate is set to the URI "http://www.ldap.com/1/schema/mapping.rdf#reference" and the object is set to be of the reference kind with a reference identifier copied from the triple of the input individual. The thread will add a triple to the temporary individual in which the predicate is set to the URI "http://www.ldap.com/1/schema/mapping.rdf#source" and the object is set to be of the reference kind with a reference identifier of the subject of the input individual. The thread will add a triple to the temporary individual in which the predicate is set to the URI "http://www.ldap.com/1/schema/mapping.rdf#destination" and the object is set to be of the reference kind with a reference identifier URI of the subject of the result individual. At step 398, the thread will then locate a mapping function by searching for a row in the ontology database mapping function set table (46) in which the value of the SOURCE CLASS column matches the predicate of the triple of the input individual and the value of the DEST CLASS column matches the class of the result individual. At step 400, if no mapping function is found, then this temporary individual is to be skipped. Otherwise, at step 402, the thread will call the method of the interface of the mapping function to determine whether the individual is to be skipped. If this mapping function indicates that this individual is to be skipped, then the individual is not included. Otherwise, at step 410, the thread will call the method of the interface of the mapping function to generate a replacement individual. At step 412, the thread will call the method of the interface of the mapping function to determine whether the replacement individual is to be flattened into a datatype property. If this replacement individual is to be preserved as an individual, then at step 416 the thread will add to the result individual a reference property, in which the reference anonymous identifier is set to that of the replacement individual. Otherwise, at step 414, the thread will flatten the replacement individual into zero or more properties of the result individual. The thread will retrieve the value of the reference identifier URI in the object of a triple of the replacement individual in which the predicate is the URI "http://www.w3.org/1999/02/22-rdf-syntax-ns#type", and will set the predicate of the triples being added to the result individual to be this reference identifier URI value. For each triple in the replacement individual with predicate "http://www.ldap.com/1/schema/mapping.rdf#reference", the thread will add a triple to the result individual in which the object is set to be of the reference kind with a reference identifier copied from the triple from the replacement individual. For each triple in the replacement individual with predicate "http://www.ldap.com/1/schema/mapping.rdf#literal", the thread will add a triple to the result individual in which the object is set to be of the data type object field kind and the contents of the object will be copied from the triple from the replacement individual. At step 420, the thread will return the result individual to the output sink that has called it.

An individuals input source component (16) is responsible for loading the state database with content from a file in an XML encoding structured as a set of zero or more RDF individuals, rather than as directory entries. This component has a single thread of processing, and this thread follows the algorithm described in FIG. 7. At step 502, the thread will start a new transaction in the state database. At step 504, the thread will load an input ontology into the state database appropriate for this input format, as well as any class or property definitions from the input file. An example of an individuals input source component would be one which reads from a file in the "Friend of a Friend" (FOAF) XML format, and this source would add to the state database the OWL class and property definitions from the FOAF ontology that are used to represent individuals. At step 506, the thread will iterate through each individual that is read from the input file. At step 508, the thread will add to the state database the triples for each property of the individual. After all the individuals from the input file have been processed, at step 512, the thread will commit the change it has made to the state database, and trigger any output sinks to read the state database.

An individuals output sink component (26) is responsible for generating a file that is in an XML encoding structured as a set of zero or more RDF individuals, rather than as directory entries. An example of an individuals output source component would be one which writes to a file in the "Friend of a Friend" (FOAF) XML format. This component has a single thread of processing, and this thread follows the algorithm described in FIG. 8A, FIG. 8B, FIG. 8C and FIG. 8D. At step 522, the thread will load an ontology into the state database which represents the output format, e.g., an ontology describing the FOAF format. At step 524, the thread will create an empty output set of individuals. At step 526, the thread will iterate through each individual in the state database (20). At step 528, the thread will test whether one or more of the individual's OWL classes is natively recognized by the output format, by searching for a triple of that individual in which the predicate is the URI "http://www.w3.org/1999/02/22-rdf-syntax-ns#type" and the object is of the reference kind with a reference identifier URI matching one of the URIs of the native output classes of the output file format, such as the URI "http://xmlns.com/foaf/0.1/Person" for the FOAF format. If the individual's ontology class is one that is natively recognized by the output format, then at step 530 the thread will add the individual to the output set. At step 534, the thread will again traverse the state database, and for those individuals which have not already been added to the output set, the thread will attempt to locate a mapping rule in the ontology database. At step 542, the thread will search the ontology database for a mapping rule in which the source class of the mapping rule matches one of the OWL classes named as an object of the "http://www.w3.org/1999/02/22-rdf-syntax-ns#type" predicate of the individual, and the destination class of the mapping rule matches one of the URIs of the native output classes of the output file format, such as the URI "http://xmlns.com/foaf/0.1/Person" for the FOAF format. If no mapping rule is found, then at step 548 the thread will skip this individual. Otherwise, the thread at step 546 will provide the individual and the mapping rule to the mapping component, and will receive back a resulting individual. At step 548, if the thread determines that the resulting individual is not of an appropriate class to be included in the output, then the thread will not add the resulting individual to the output set. Otherwise, at step 550 the resulting individual is added to the output set. After all the individuals have been processed, at step 560 the thread will determine the namespaces of the ontologies by scanning the RDF triples of the individuals in the output set. At step 562, the thread will open the output file for writing. At step 564, the thread will write a header to the output file. If the file format is RDF-based, then the thread will write a header of a line with text "<?xml version="1.0"?>", followed by a line comprising the XML element "RDF" in the namespace "http://www.w3.org/1999/02/22-rdf-syntax-ns#", as well as declarations for all of the namespaces found at step 560. At step 566, the thread will iterate through each individual in the output set. At step 568, the thread will determine if an individual has an object property with URI "http://www.w3.org/1999/02/22-rdf-syntax-ns#type" which has a value that is a URI in one of the namespaces located in step 560. If such a property is found, then at step 572 the thread will write the individual to output file in a serialized form determined by the file format and the type. If the file format is RDF-based, then the thread will write the individual to the output file in a serialized form as an RDF typed node element, as described in section 2.13 of "RDF/XML Syntax Specification (Revised)" by D. Beckett of February 2004. At step 574, if the property was not found and if the file format is RDF-based, then the thread will write the individual to the output file in a serialized form within a RDF "Description" XML element, as described in section 2.2 of "RDF/XML Syntax Specification (Revised)" by D. Beckett of February 2004. At step 582, after all the individuals in the output set have been traversed, the thread will write a footer to the output file, and close the output file. If the file format is RDF-based, then the thread will write as the footer a line comprising the closing of the XML element "RDF" in the namespace "http://www.w3.org/1999/02/22-rdf-syntax-ns#", which is typically encoded as "</rdf:RDF>".

CONCLUSIONS

Many different embodiments of this invention may be constructed without departing from the scope of this invention. While this invention is described with reference to various implementations and exploitations, and in particular with respect to systems for translating the contents of a directory file from one schema to another, it will be understood that these embodiments are illustrative and that the scope of the invention is not limited to them.

What is claimed is:

1. A method of translating and mapping a directory entry to be formatted in a destination directory schema,
   wherein said directory entry can be formatted in a source directory schema,
   wherein said translating is directed by an ontology of said destination directory schema comprising a plurality of classes expressed in a statement format of a resource description framework and a plurality of mapping functions,
   said method comprising
   (a) converting said directory entry between a directory-specific data format and said statement format that incorporates creating a triple in said statement format for each attribute of said directory entry in said directory-specific data format defined by said source directory schema;
   (b) translating said directory entry in said statement format from a class of an ontology of said source directory schema to said class of said ontology of said destination directory schema by locating said class of said ontology of said destination directory schema in a database and translating each triple of said directory entry;
   (c) mapping said directory entry by locating, for each triple of said directory entry, a mapping function corresponding to a set of said class of said ontology of said source directory schema, said class of said ontology in said destination directory schema and a predicate of said triple in said database, and providing each triple of said directory entry in said statement format expressed as a temporary individual entry and said class of said ontology of said destination directory schema to said mapping function in an execution environment which produces a replacement individual entry that replaces said triple of said directory entry in said statement format with a replacement triple in said destination directory schema; and (d) converting said directory entry between said statement format and said directory-specific data format.

2. The method of claim 1, wherein said converting further comprises converting between a lightweight directory access protocol data interchange format and said statement format that incorporates creating said triple in said statement format for each attribute of said directory entry contained in said lightweight directory access protocol data interchange format, wherein a type of said attribute is defined by said source directory schema that is expressed in said lightweight directory access protocol data interchange format.

3. The method of claim 1, wherein said converting further comprises converting between a directory service markup language and said statement format that incorporates creating said triple in said statement format for each attribute of said directory entry contained in said directory service markup language, wherein a type of said attribute is defined by said source directory schema that is expressed in said directory service markup language.

4. The method of claim 1, wherein said converting further comprises converting between a service provisioning markup language and said statement format that incorporates creating said triple in said statement format for each attribute of said directory entry contained in said service provisioning markup language, wherein a type of said attribute is defined by said source directory schema that is expressed in said service provisioning markup language.

5. The method of claim 1, wherein said mapping further comprises retrieving bytecodes encoding said mapping function from said database indexed by said class of said ontology of said destination directory schema and executing said bytecodes encoding said mapping function in a virtual machine.

6. A system for translating and mapping a directory entry to be formatted in a destination directory schema, wherein said directory entry can be formatted in a source directory schema, wherein said translating is directed by an ontology of said destination directory schema comprising a plurality of classes expressed in a statement format of a resource description framework and a plurality of mapping functions, said system comprising
 (a) a processor;
 (b) a state database configured to store said directory entry in said statement format as a plurality of triples;
 (c) a memory device coupled to the processor for storing computer-implemented instructions, when executed by the processor, providing
  (i) a directory input source configured to convert said directory entry between a directory-specific data format and said statement format, wherein said converting comprises including in said directory entry in said statement format a triple in said statement format for each attribute of said directory entry in said directory-specific data format defined by said source directory schema;
  (ii) a mapper component configured to translate said directory entry in said statement format from a class of an ontology of said source directory schema to said class of said ontology of said destination directory schema by locating said class of said ontology of said destination directory schema in said state database, translating each triple of said directory entry and locating for each triple of said directory entry, a mapping function corresponding to a set of said class of said ontology of said source directory schema said class of said ontology in said destination directory schema and a predicate of said triple in said state database;
  (iii) an execution environment configured to interpret a method of said mapping function provided by said mapper component wherein said function is provided with said triple of directory entry in said statement format and said class of said ontology of said destination directory schema and produces a replacement individual entry that replaces said triple of said directory entry in said statement format with a replacement triple in said destination directory schema;
  (iv) a directory output sink configured to convert said directory entry between said statement format in said state database and said directory-specific data format.

7. The system of claim 6, wherein said directory input source, said state database, said mapper function, said execution environment, and said directory output sink are implemented as software running on a general-purpose computer system.

8. The system of claim 6, further comprising a directory server, wherein said directory entry is provided to said directory input source by said directory server formatted in said source directory schema.

9. The system of claim 6, wherein said execution environment further comprises a virtual machine, wherein said virtual machine is configured to execute a bytecodes encoding said mapping function, and said bytecodes are stored in said state database indexed by said class of said ontology of said destination directory schema.

10. A computer program product stored in a memory device with software for translating and mapping a directory entry to be formatted in a destination directory schema, wherein said directory entry can be formatted in a source directory schema, wherein said translating is directed by an ontology of said destination directory schema comprising a plurality of classes expressed in a statement format of a resource description framework and a plurality of mapping functions, said computer program product comprising
 (a) computer-implemented instructions, when executed by a processor, for converting said directory entry between a directory-specific data format and said statement format that incorporates instructions for creating a triple in said statement format for each attribute of said directory entry in said directory-specific data format defined by said source directory schema;
 (b) computer-implemented instructions, when executed by a processor, for translating said directory entry in said statement format from a class of an ontology of said source directory schema to said class of said ontology of said destination directory schema, wherein said instructions comprise instructions for locating said class of said ontology of said destination directory schema in a database, instructions for translating each triple of said directory entry, and instructions for locating, for each triple of said directory entry, a mapping function corresponding to a set of said class of said ontology of said source directory schema, said class of said ontology in said destination directory schema and a predicate of said triple in said database;
 (c) computer-implemented instructions, when executed by a processor, for mapping said directory entry by providing each triple of said directory entry in said statement format expressed as a temporary individual entry and said class of said ontology of said destination directory schema to said mapping function in an execution environment which produces a replacement individual entry that replaces said triple of said directory entry in said statement format with a replacement triple in said destination directory schema;

(d) computer-implemented instructions, when executed by a processor, for converting said directory entry between said statement format and said directory-specific data format.

11. The computer program product of claim 10, wherein said execution environment further comprises a virtual machine, wherein said virtual machine is configured to execute a bytecodes encoding said mapping function, and said bytecodes are stored in said state database indexed by said class of said ontology of said destination directory schema.

* * * * *